Patented July 19, 1949

2,476,331

UNITED STATES PATENT OFFICE 2,476,331

METHOD OF MAKING METHYL CARBOXY-METHYL CELLULOSE

Richard W. Swinehart, Albert B. Savage, and William D. Kuhlman, Midland, Mich., assignors to The Dow Chemical Company, Midland, Mich., a corporation of Delaware No Drawing. Application November 15, 1945, Serial No. 628,961

3 Claims. (Cl. 260—231)

This invention relates to a mixed ether of cellulose containing specific amounts of methyl and carboxyalkyl (especially carboxymethyl) substituent groups. It relates as well to a method for the preparation of the new methyl carboxymethyl cellulose and to a method for its purification.

The most commonly available water-soluble cellulose ethers have been methyl cellulose and the salts of carboxymethyl cellulose. The most useful methyl cellulose of commerce has been one containing about 2 methoxyl groups per anhydroglucose unit. This material has been widely employed as a thickening agent in aqueous solutions and dispersions, as a sizing material, and as a stabilizer for emulsions and other colloids. It has the advantage of forming highly viscous solutions at low concentrations in water but suffers from the disadvantage (for some purposes) of gelling from aqueous media when heated to temperatures of 55° C., or slightly higher. The property of insolubility in hot water is useful, of course, when it is desired to free the crude ether from the water-soluble impurities produced during its manufacture, but is a distinct disadvantage when the material is to be used in thickening or stabilizing beverages, confections, ointments, or any other composition which must be sterilized or pasteurized by a heat treatment.

The commercially available salts of carboxymethyl cellulose, especially the sodium salt, which contain about 0.5 to 0.9 carboxymethyl groups per anhydro-glucose unit, are also widely recommended as thickeners and stabilizers for aqueous solutions and dispersions. The sodium salts have the property, however, of being directly soluble in cold water and of remaining dissolved at elevated temperatures, often as high as the boiling point of water. While this is an advantage in compositions which must be heated during their manufacture or use, it presents a problem of purification of the crude cellulose ether. Water-soluble impurities such as by-product sodium chloride or sodium glycolate cannot be removed by washing with water. Precipitation of the ether from acidified media has not proven practical because of the large amounts and high concentrations of acid required and because, at best, only partial coagulation is obtained even when using acids as strong as 14 normal hydrochloric acid or sulfuric acid. Resort has been necessary to the undesirable practice of purifying crude sodium carboxymethyl cellulose with aqueous alcoholic solutions.

It is much to be desired, and it is among the objects of this invention, to provide a cellulose ether which is soluble directly in water at room temperature and which remains dissolved when aqueous solutions thereof are heated to 80° C. or higher, if possible, but which may be made insoluble in aqueous media to permit extraction therefrom of water-soluble impurities and may then again be made soluble in water over the wide temperature range suggested above. Another object is the provision of a method whereby such desired cellulose ether may be produced. A further object is to provide a method for the purification of a particular new cellulose ether to be described hereinafter. Other and related objects may become apparent from the following description and the appended claims.

It has now been found that the foregoing and related objects may be attained through the provision of a particular mixed ether of cellulose containing methyl and carboxymethyl substituents in a specific ratio. More particularly, it has been found that a cellulose ether which meets the conditions outlined above, and which we believe to be new, is one containing an average of from 0.7 to 2.1 methoxyl groups and from 0.02 to 0.3 carboxymethyl groups per anhydro-glucose unit. When a mixed ether of cellulose is produced with the two types of substituents present within the specified ranges, the product is found to behave like carboxymethyl cellulose when in media having a pH above about 6, and to behave like methyl cellulose when in acid aqueous media at a pH from 4 to 2. The etherification reaction, to be described more fully hereinafter, is conducted under conditions such that the crude product is usually a sodium salt of methyl carboxymethyl cellulose. This product can be dissolved in water at room temperature and remains in solution when at a pH of 7 or higher at any temperature up to 80° or 90° C., and sometimes at more elevated temperatures. When, however, the originally alkaline or neutral solution is acidified to a pH in the range from 2 to 4, the mixed ether remains in aqueous solution only at temperatures below about 55° C., gelling at higher temperatures. The new ether, when in the fibrous state in which it is first obtained, can be washed free of water-soluble impurities by suspending it in hot acidulated water at a pH from 2 to 4. After such purification, neutralization converts the mixed ether to a form which is soluble in water at room temperature and which remains dissolved when heated to about 80° C. or higher in neutral or alkaline aqueous media.

The new mixed ether is prepared by first immersing cellulose fibers, preferably in sheet form, in a 5 to 27.5 per cent solution in water of sodium monochloroacetate or monochloroacetic acid, usually at or near room temperature. The saturated sheet is pressed to remove as much as possible of the aqueous solution. It is found that there remains in the fibers an amount of from 0.5 to 1.0 gram of the monochloroacetic solution, or from 0.05 to 0.22 gram of the chloroacetic compound, per gram of cellulose. The preferred amount of this reagent is in the range from 0.5 to 0.6 gram of 20 to 27.5 per cent solution per gram of cellulose. The impregnated fibers are next immersed in a 40 to 55 per cent solution of sodium hydroxide at a temperature which should not exceed 60° C., and which is preferably kept as low as posible to prevent degradation or viscosity reduction in the cellulose derivative. After this treatment, the fibers are cooled at least to 30° C. and are pressed to reduce the alkali to cellulose ratio to a value in the range from 0.7 to 1.3. For reasons of economy of reagents, as well as uniformity in the final product, it has been found preferable to have the alkali to cellulose ratio below a value of 1. The impregnated fibrous mass may be etherified immediately or it may be aged for a period from a few hours to a few days at or above room temperature to permit a gradual reduction in the viscosity characteristics of the cellulosic material present. As soon as the sodium hydroxide is introduced into the mass, the reaction between the monochloroacetic acid and cellulose begins to take place, with introduction of carboxymethyl groups into the cellulose chain. The methylation reaction is carried out in the usual manner in a closed vessel in the presence of a slight excess of methyl chloride over the amount of sodium hydroxide present at a temperature which may range up to 80° C. and over a period of from about 8 to 14 hours. This reaction is stopped when the desired amount of methylation has occurred and, after removing volatile materials from the vessel, the new mixed ether is subjected to purification treatment. The amount of methyl chloride introduced into the methylator may range from about 1.2 to about 1.4 parts by weight per part of cellulose present. When the reaction is carried out in the manner described above, the amount of unreacted methyl chloride remaining at the end of the reaction is very small. When the etherification reaction is complete and any excess methyl chloride and other volatile materials have been removed from the reaction vessel, the fibrous cellulose derivative, together with any remaining caustic alkali, sodium chloride, and sodium glycolate, is suspended in from 3 to 10 times its weight of water which has been acidified with sufficient hydrochloric acid to reduce the pH of the mixture to a value between 2 and 4. The suspension medium is preferably at a temperature of 80° C., or higher. After agitation, the acid form of methyl carboxymethyl cellulose is obtained. The slurry may be filtered and the acid cellulose ether may be washed until free from salt, using additional quantities of hot water. If it is desired merely to obtain the ether in the acid form, i. e. as methyl carboxymethyl cellulose, the product may then be dried and stored for subsequent use.

It is ordinarily desired to employ the cellulose ether in the form of a sodium salt of methyl carboxymethyl cellulose. The sodium salt of the purified mixed ether may be prepared in any of a number of ways. The particular manner in which the salt will be prepared will depend in part on the use to which it will be put. In many cases, it may be satisfactory to suspend the acid form of the mixed ether in water and to stir into the solution an amount of an alkali, such as sodium hydroxide, sodium carbonate, or sodium bicarbonate, sufficient to neutralize the carboxyl groups present in the ether. Neutralization results in solution of the mixed ether when carried out in this manner. When it is desired, instead, to produce a solid form of the sodium salt of methyl carboxymethyl cellulose, a more convenient method has been found. The solid, acid form, of methyl carboxymethyl cellulose may be spread out in a thin layer on a suitable support and may be sprinkled with a powdered form of an alkali or, preferably, sprayed with an aqueous solution of sodium hydroxide, sodium carbonate, or sodium bicarbonate in a quantity sufficient to neutralize the carboxyl groups. The so-sprayed material may then be dried to form the sodium salt of methyl carboxymethyl cellulose. Because the water-soluble ethers of this type may be employed in food products, it is often preferable to effect the neutralization step with sodium bicarbonate, since a slight excess of this material over the amount needed to neutralize the cellulose ether will not be objectionable in food products.

The neutral product, containing from 0.02 to 0.3 carboxymethyl groups and from 0.7 to 2.1 methoxyl groups per anhydro-glucose unit, has the property of remaining dissolved in neutral or alkaline aqueous media at temperatures up to at least 80° C., and of gelling from acid aqueous media having a pH in the range of from 2 to 4 at considerably lower temperatures, usually near 55° C.

The following examples illustrate the practice of the present invention:

*Example 1*

A sheet of cotton linters was immersed in a 25 per cent aqueous solution of sodium chloroacetate at room temperature. As soon as the sheet was saturated with the solution it was removed therefrom and pressed to remove excess solution. The so-treated sheet weighed 1.7 times the original weight and contained about 0.18 gram of sodium choloracetate per gram of cellulose. The sheet was then dipped into a 50 per cent solution of sodium hydroxide at 25° C. and was pressed again to remove excess treating liquor. The amount of sodium hydroxide absorbed in this treatment was about 0.69 gram per gram of cellulose. The sheet was shredded, the impregnated cotton was placed in a pressure vessel, treated with 1.33 times its own weight of methyl chloride for 10 hours at temperatures ranging from about 60° to a final value near 80° C. Excess methyl chloride was then vented from the reactor and it was found that 0.96 pound of methyl chloride had been consumed for each pound of cellulose originally present. 300 grams of the crude reaction mixture was stirred into 1700 cubic centimeters of distilled water to which had been added 50 cubic centimeters of concentrated hydrochloric acid. The acidified water had been heated to a temperature of 90° C. before addition of the cellulose ether product. Stirring was continued until all parts of the cellulose ether were assumed to have been substantially freed from alkali and salt. The suspension had a pH of about 2. The suspension was then filtered in a basket centrifuge, the solids being retained in a canvas bag. The solids were washed with hot distilled water (75° C.) and the product was finally broken into small lumps and dried. At this stage, the ether could be dissolved in water in accordance with standard methyl cellulose practice, and could be gelled therefrom by heating the aqueous solution to temperatures above 55° C., or it could be dissolved in dilute alkali, with formation of the sodium salt of the ether, and would remain dissolved in such neutral or alkaline solutions when heated to temperatures above 90° C. The bulk of the acid product was spread in a thin layer on a steel pan and was sprayed with just sufficient 25 per cent sodium hydroxide solution to neutralize the carboxyl groups present. The so-treated product was dried and stored for future use. Its solutions in water did not gel at temperatures up to 90° C. Analysis showed the mixed ether to contain 1.45 methoxyl groups (23.9 per cent) and 0.14 carboxymethyl groups per anhydro-glucose unit.

*Example 2*

Another batch of the same cellulose was etherified in the same manner, under conditions such that the cellulose picked up 0.17 gram of sodium chloroacetate and 0.99 gram of sodium hydroxide, per gram of cellulose. The charge of methyl chloride was the same as before, but etherification was continued until 1.24 pounds of methyl chloride had been consumed for each pound of cellulose present. The product was freed from salt and remaining alkali by the previously described treatment with acidulated water at 80° C., and, after filtration, was placed in a tumbler which was so-mounted as to rotate on its horizontal axis. Longitudinal fins in the tumbler kept the mass in agitation while a neutralizing spray was introduced through a special port provided for the purpose. The spray consisted of a 14 per cent solution of sodium bicarbonate in water at 100° C. The spraying was continued only until 0.04 pound of bicarbonate had been introduced for each pound of the methyl carboxy-methyl cellulose, which contained 1.7 methoxyl and 0.12 carboxymethyl groups per anhydro-glucose unit. The so-formed sodium salt was dried and found to have the solubility characteristics previously described, with no apparent gel point in neutral aqueous media to temperatures of 100° C. Its 2 per cent solution in water at 20° C. had a viscosity of 1120 centipoises.

It has been found advantageous, when carrying out the described neutralization with a spray of hot sodium bicarbonate solution, to include in the solution being sprayed a small amount of sodium mono-acid phosphate ($Na_2HPO_4.7H_2O$), to serve as a buffer in the finished product. Thus, when otherwise equivalent treatments have been given to the acid form of methyl carboxymethyl cellulose to form sodium salts thereof, and when enough sodium bicarbonate has been added theoretically to effect full neutralization, products have been obtained which form solutions having pH values ranging from 3 to 10, and an excess of bicarbonate is required to assure neutralization. When, however, the sodium mono-acid phosphate is used, the neutralized product forms solutions with pH 7. A suitable amount of buffer and of bicarbonate to be used, when neutralizing a methyl carboxymethyl cellulose containing about 0.16–0.17 carboxymethyl groups per anhydro-glucose unit has been found to be 0.01 pound of the phosphate and 0.07 pound of the sodium bicarbonate, in the form of a 12 to 14 per cent bicarbonate solution in water at 100° C., for each pound of the cellulose ether. Correspondingly, smaller or larger amounts are used for treating cellulose ethers with smaller or larger amounts of carboxymethyl substituents.

*Example 3*

To illustrate the applicability of the invention to methyl carboxyalkyl ethers of cellulose, wherein the carboxyalkyl substituent is other than carboxymethyl, the following preparation is reported.

A sheet of 600 second purified cotton linters was dipped at room temperature into a 25 per cent aqueous solution of B-chloropropionic acid. The sheet was removed and pressed to about 1.7 times its original weight. The so-treated sheet was then immersed in a 50 per cent aqueous solution of sodium hydroxide at 15° to 20° C., and was then subjected to pressure to express excess alkali solution. The alkali to cellulose ratio was 1.02 and the B-chloropropionic acid to cellulose ratio was 0.16. The impregnated sheet was shredded for 30 minutes at room temperature in a Werner-Pfleiderer type of shredder. The shredded product was methylated with 1.4 pounds of methyl chloride per pound of cellulose, under pressure, and at the usual temperatures. Methylation was continued for about 10 hours, and was discontinued when the charge in the reaction vessel contained only 0.5 per cent residual alkali. At this point there had been consumed 1.24 pounds of methyl chloride per pound of cellulose.

The reaction mixture was dumped into about 5 times its weight of hot water at 85° C., which had been acidulated to pH 2 with hydrochloric acid. After stirring, the suspended fibrous product was separated from the wash liquor in a basket centrifuge, and was further washed with boiling water, until free from alkali and chlorides. The so-purified methyl carboxyethyl cellulose was then oven-dried. Analysis showed the product to contain 1.83 methoxyl and 0.10 carboxyethyl groups per anhydro-glucose unit. When dissolved in water to form a 2 per cent solution, and acidified to pH 2, the new ether had a viscosity of 5850 centipoises and a gel temperature of 60° C. A 2 per cent aqueous solution at pH 7 (neutralized with normal sodium hydroxide solution) had a viscosity of 4640 centipoises and a gel point near 80° C.

As a result of numerous preparations made on batches of cellulose ranging from a few grams to several pounds in weight, it was determined that the desired solubility behavior could be obtained whenever the methoxyl content was in the range between 0.7 and 2.1 groups per anhydro-glucose unit and the accompanying carboxymethyl substituent was present in amounts from 0.02 to 0.3 groups per anhydro-glucose unit. The required degree of substitution, it was found, could be assured by an initial impregnation with an aqueous solution of either sodium chloroacetate of monochloroacetic acid of from 5 to 27.5 per cent concentration, followed by a treatment to express any excess chloroacetate solution over 1.0 and preferably any over 0.6 gram, per gram of cellulose. The minimum amount of the chloroacetic solution should be 0.5 gram per gram of cellulose. The corresponding amounts of absorbed chloroacetic compound range from about 0.05 to 0.22 gram, per gram of cellulose. The preferred amount is near 0.15 to 0.19 gram and will produce an ether containing from 0.11 to 0.15 carboxymethyl groups per anhydro-glucose unit. The use of chloroacetate solutions more dilute than 20 per cent, results in formation of a product having a lower gel point (usually near 80° C.), while chloroacetate solutions over 20 per cent strength make possible the formation of an ether which does not gel below 90° C.—often not below 100° C. Similarly, solutions of chloroacetate more concentrated than 27.5 per cent leave too heavy a deposit in the cellulose, and it is impractical to squeeze out this excess to the required limit. The temperatures employed and the amounts and concentrations of sodium hydroxide, as well as preferred amounts of methyl chloride, have been discussed previously. By suitable variation of the sodium hydroxide temperature, or the aging period before methylation, or both, the viscosity of the new mixed ether has been varied from 6 to 50,000 centipoises (measured on a 2 per cent aqueous solution), higher temperatures or concentrations of alkali and longer aging periods reducing the viscosity, and low temperatures and shortened or eliminated aging periods tending to yield high viscosity products.

It is to be understood that any cellulose fibers of high alpha-cellulose content may be employed, instead of the purified cotton linters used in the examples. Similarly, any water-soluble carboxyalkylating agent may be used in place of the disclosed chloroacetic acid and sodium chloroacetate. Such agents include the chloropropionic and chlorobutyric acids and their salts. The processes disclosed are adapted as well to the formation of the ammonium, potassium and other water-soluble salts of the new mixed cellulose ether as they are to the described formation of the sodium salt. It is understood, of course, that the new mixed ethers are capable of forming salts other than the ones suggested above, and that polyvalent metal salts, including the aluminum salt, may be used advantageously wherever the corresponding salts of carboxymethyl cellulose are useful. Other variations of and departures from the disclosure, within the skill of the art, are contemplated as part of the present invention.

We claim:

1. The method which comprises immersing high alpha-cellulose fibers in a 5 to 27.5 per cent aqueous solution of a carboxyalkylating agent, pressing the fibers to bring the amount of retained carboxyalkylating agent within the range from 0.05 to 0.22 parts by weight per part of cellulose, immersing the so-treated fibers in a 40 to 55 per cent aqueous solution of sodium hydroxide at a temperature not exceeding 60° C., pressing the mass to bring the alkali to cellulose ratio to a value in the range from about 0.7 to 1.3, and methylating the resultant product with from 1.2 to 1.4 parts by weight of methyl chloride per part of cellulose, under pressure, at a reaction temperature below 80° C., discontinuing the reaction before the extent of methylation exceeds 2.1 methoxyl groups per anhydro-glucose unit, and recovering in a usable form the mixed ether of cellulose containing from 0.02 to 0.3 carboxyalkyl groups and from 0.7 to 2.1 methoxyl groups per anhydro-glucose unit.

2. The method which comprises immersing high alpha-cellulose fibers in a 5 to 27.5 per cent aqueous solution of a carboxymethylating agent, pressing the fibers to bring the amount of retained etherifying agent within the range from 0.05 to 0.22 parts by weight per part of cellulose, immersing the so-treated fibers in a 40 to 55 per cent aqueous solution of sodium hydroxide at a temperature not exceeding 60° C., pressing the mass to bring the alkali to cellulose ratio to a value in the range from about 0.7 to 1.3, and methylating the resultant product with from 1.2 to 1.4 parts by weight of methyl chloride per part of cellulose, under pressure, at a reaction temperature below 80° C., discontinuing the reaction before the extent of methylation exceeds 2.1 methoxyl groups per anhydro-glucose unit, and recovering in a usable form the mixed ether of cellulose containing from 0.02 to 0.3 carboxymethyl groups and from 0.7 to 2.1 methoxyl groups per anhydro-glucose unit.

3. The method which comprises immersing a sheet of high alpha-cellulose fibers in a 20 to 27.5 per cent solution of sodium chloroacetate, pressing the sheet to a residual chloroacetate content between about 0.15 and 0.19 parts by weight per part of cellulose, immersing the so-treated sheet in a 40 to 55 per cent aqueous solution of sodium hydroxide at a temperature below 60° C., pressing the sheet to bring the alkali to cellulose ratio to a value in the range from 0.7 to 1.3, and heating the so-formed mass with from 1.2 to 1.4 parts by weight of methyl chloride per part of cellulose, under pressure, and at reaction temperatures below 80° C., discontinuing the reaction before the extent of methylation exceeds 2.1 methoxyl groups per anhydro-glucose unit, and recovering in a usable form the so-formed mixed ether of cellulose containing from 0.11 to 0.15 carboxymethyl groups and from 0.7 to 2.1 methoxyl groups per anhydro-glucose unit.

RICHARD W. SWINEHART.
ALBERT B. SAVAGE.
WILLIAM D. KUHLMAN.

REFERENCES CITED

The following references are of record in the file of this patent:

UNITED STATES PATENTS

| Number | Name | Date |
|---|---|---|
| 1,682,294 | Lillienfeld | Aug. 28, 1928 |
| 2,137,343 | Maxwell | Nov. 22, 1938 |
| 2,236,545 | Maxwell | Apr. 1, 1941 |

FOREIGN PATENTS

| Number | Country | Date |
|---|---|---|
| 458,597 | Great Britain | Dec. 22, 1936 |